July 25, 1939.  E. A. CORBIN, JR  2,166,941
KNOCK-DOWN FURNITURE FRAME
Filed Dec. 15, 1937
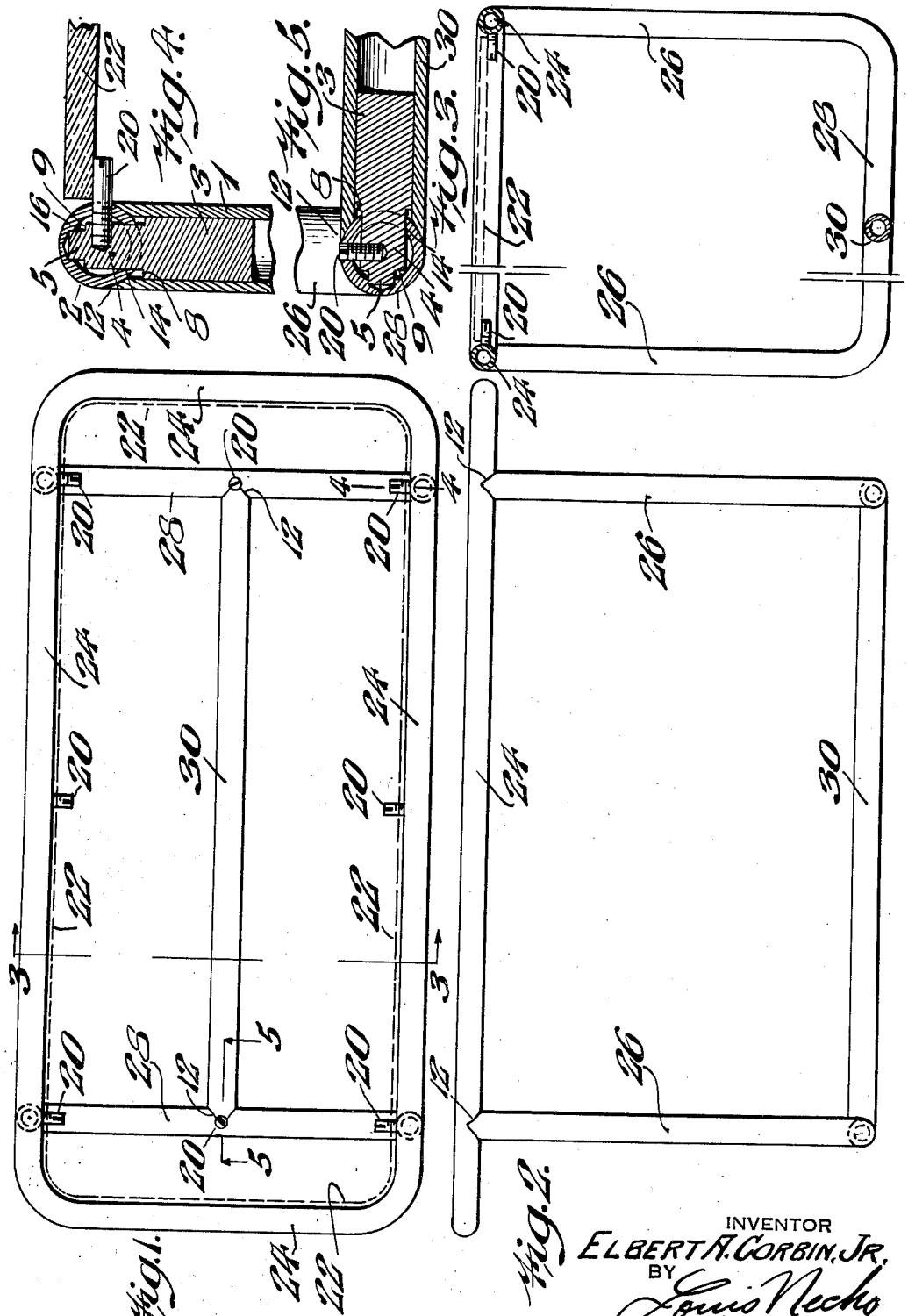
INVENTOR
*Elbert A. Corbin, Jr.*
BY
*Louis Necho*
ATTORNEY Patented July 25, 1939

2,166,941

UNITED STATES PATENT OFFICE 2,166,941

KNOCK-DOWN FURNITURE FRAME

Elbert A. Corbin, Jr., Lansdowne, Pa., assignor to William C. Biddle, Lansdowne, Pa.

Application December 15, 1937, Serial No. 179,899

1 Claim. (Cl. 311—1)

My invention relates to a new and useful knock-down furniture frame whereby a piece of furniture such as a table, chair, desk, or the like, can, after being manufactured, fitted and assembled, be dismantled for shipment and reassembly at place of use thus greatly reducing the cost of packing and transportation.

My invention more particularly relates to a modern knock-down furniture frame, that is, the type of furniture frame which is formed in the modernistic manner and consisting of pipe sections formed in various shapes and connected together to form a frame which is at once rigid and attractive in appearance.

My invention still further relates to a knock-down furniture frame of this character which can be assembled by the purchaser without any assistance and without any special skill thereby further reducing the costs of marketing such furniture by eliminating the necessity of having skilled artisans assemble the furniture at the point of use.

My invention still further relates to a furniture frame of this character in which, if desired, the fastening devices can also be used for supporting the table top of a table, the seat part of a chair, or the like, and in which the assembly produced is extremely rigid at the same time that it is easily taken apart.

As far as I am aware modernistic furniture frames made of piping have heretofore been made either of integral pieces bent around to the proper shape or design, or have been formed of separate sections welded together as illustrated by the Shafer Patent No. 1,672,100 of June 5, 1928, and in either case the furniture frame thus produced lacked the desirable characteristic of being easily dismantled and assembled for the purposes hereinabove outlined.

In the accompanying drawing;

Fig. 1 represents a plan view of a knock-down furniture frame embodying my invention, the same being shown as especially adapted or constructed for use as a table.

Fig. 2 represents a side elevation of Fig. 1.

Fig. 3 represents a section on line 3—3 of Fig. 1.

Fig. 4 represents a section, on an enlarged scale, on line 4—4 of Fig. 1.

Fig. 5 represents a section, on an enlarged scale, on line 5—5 of Fig. 1.

Referring to the drawing in which like reference characters indicate like parts and referring more particularly to Fig. 4, I designates a pipe section which is to be secured, according to my invention, to another pipe section 2, the pipe sections 1 and 2 being disposed at an angle to each other. 3 designates a dowel which is positioned in one of the pipe sections and which, as illustrated in Fig. 4, is positioned in the pipe section 1, said dowel pin being provided with a reduced portion 4 which is provided with the further reduced portion 5. At the base of the reduced portion 4 is formed the shoulder 8, while at the base of the end reduced portion 5 is formed the shoulder 9. The pipe 1 is cut away as at 12 so as to form a seat for the transversely disposed pipe 2, whereby, when the pipes 1 and 2 are in the assembled position shown in Fig. 4, the outside of the pipe 1 is flush with the outside of the pipe 2. Similarly, the pipe 2 is cut away as at 14 so as to permit entry of the reduced portions 4 and 5 of the dowel 3 and preferably, the pipe 2 is also reamed or otherwise recessed at 16 to accommodate the end portion 5 of the dowel 3. The shoulder 8 affords enough room for accommodating the corresponding edges of the pipe 2 where it is cut away at 14, and the shoulder 9 similarly affords room for accommodating the thickness of the pipe 2 near the point at which the edge of the end 5 engages the recess 16 in the pipe 2. 20 designates a bolt or screw which threadedly engages the portion 4 of the dowel 3 and the pipe 2. If desired, the securing bolt 20 can be extended beyond the plane of the pipes 1 and 2, as best seen in Figs. 1 and 4, in order to support the table top 22, which may be of glass or otherwise, or to support the seat of a chair, etc. Where the bolt 20 is used only for securing pipe sections together, as shown in Fig. 5, the screw 20 is cut short so that the head thereof is flush with the exterior of the pipe sections secured thereby.

In the form illustrated in the drawing I have shown my invention as applied to the construction of a table and, in this instance, the frame consists of the upper pipe section 24 which may be rectangular as shown, oval, round, or any desired size or shape, and which is supported by two or more U-shaped pipe sections 26, the bottom members 28 of said U-shaped sections being interconnected by one or more sections 30 to afford the desired strength. At the points at which the upper edges of the U-shaped sections 26 are connected to the undersides of the top section 24 I use the long bolts 20 so as to provide a support for a detachable top 22, whereas, at the points where the opposite ends of the cross-piece 30 are connected to the bottom members 28 of the U-shaped member 26, I use the short bolt 20 illustrated in Fig. 5.

While I have illustrated a table constructed according to my invention, I want it understood that my invention is not directed nor limited to a table construction and that my invention is directed broadly to the fastening arrangement by which pipe sections used in the making of furniture frames are connected together in a detachable, easily assembled and easily dismantled manner, together with the idea of using the fastening device as a support for the table top, chair seat, or the like. Applying the invention, for instance, to a modernistic arm chair which is made of pieces of pipe deflected in any decorative style to form the sides and arms of the chair, and which at the present time are interconnected by cross-pieces forming the back as well as bottom supports, it will be seen that pipe sections forming the sides and arms can be made separate, and that the cross-pieces for connecting the same at the bottom or at the back can also be made in separate pieces, and provided at the point of manufacture with the dowels 3 and the rest of the construction described so that all the portions of the frame can be shipped in a compact package where all the pieces can lie flat, one upon the other, to be assembled at the point of use. Furthermore, by my invention, if one part of the frame is damaged, the same can be removed either for replacement or for repair without the necessity of transporting the entire piece of furniture.

Having thus described my invention, what I claim as new and desire to secure by Letters Patent is:

In a knock-down furniture frame formed of separable pipe sections, means for detachably securing said pipe sections comprising a dowel fastened in the end of one pipe section and projecting into an adjacent pipe section, and a pin for securing said dowel to said last mentioned pipe section, said pin extending horizontally inwardly of the vertical plane of the adjacent pipe sections and constituting a support for a table top.

ELBERT A. CORBIN, Jr.